United States Patent
Hoff et al.

(10) Patent No.: US 9,209,624 B2
(45) Date of Patent: Dec. 8, 2015

(54) SYSTEM AND METHOD FOR OVERRIDING DEMAND SYSTEM MANAGEMENT ENABLED FUNCTIONS

(75) Inventors: Kyran Patricia Hoff, Louisville, KY (US); William Newton, Brooks, KY (US)

(73) Assignee: General Electric Company, Schenectady, NY (US)

( * ) Notice: Subject to any disclaimer, the term of this patent is extended or adjusted under 35 U.S.C. 154(b) by 324 days.

(21) Appl. No.: 13/288,081

(22) Filed: Nov. 3, 2011

(65) Prior Publication Data

US 2013/0116829 A1   May 9, 2013

(51) Int. Cl.
G06F 19/00 (2011.01)
H02J 3/14 (2006.01)
H02J 13/00 (2006.01)
G06Q 50/06 (2012.01)

(52) U.S. Cl.
CPC .............. *H02J 3/14* (2013.01); *H02J 13/0006* (2013.01); *H02J 13/0079* (2013.01); *G06Q 50/06* (2013.01); *H02J 13/0062* (2013.01); *H02J 13/0075* (2013.01); *H02J 2003/143* (2013.01); *H02J 2003/146* (2013.01)

(58) Field of Classification Search
CPC ... H02J 3/14; H02J 13/0079; H02J 2003/143; H02J 2003/146; G06Q 50/06
USPC ................................. 700/286, 295
See application file for complete search history.

(56) References Cited

U.S. PATENT DOCUMENTS

| | | | |
|---|---|---|---|
| 7,177,728 B2* | 2/2007 | Gardner ....................... | 700/295 |
| 7,460,930 B1* | 12/2008 | Howell et al. ................ | 700/295 |
| 7,627,401 B2* | 12/2009 | Benson et al. ................ | 700/295 |
| 7,873,441 B2* | 1/2011 | Synesiou et al. .............. | 700/286 |
| 7,937,461 B2* | 5/2011 | Kutzik et al. ................. | 709/224 |
| 8,190,302 B2* | 5/2012 | Burt et al. ...................... | 700/295 |
| 8,280,556 B2* | 10/2012 | Besore et al. ................. | 700/278 |
| 8,367,984 B2* | 2/2013 | Besore et al. ................. | 219/490 |
| 8,463,448 B2* | 6/2013 | Burt et al. ..................... | 700/286 |
| 8,474,279 B2* | 7/2013 | Besore et al. ................... | 62/157 |
| 8,541,719 B2* | 9/2013 | Steurer ......................... | 219/493 |
| 8,793,021 B2* | 7/2014 | Watson et al. ................ | 700/276 |
| 8,803,040 B2* | 8/2014 | Steurer ......................... | 219/483 |
| 2010/0070091 A1* | 3/2010 | Watson et al. ................ | 700/278 |
| 2010/0070099 A1 | 3/2010 | Watson et al. | |
| 2010/0089909 A1* | 4/2010 | Besore et al. ................. | 219/720 |
| 2010/0092625 A1 | 4/2010 | Finch et al. | |
| 2010/0101254 A1* | 4/2010 | Besore et al. ................... | 62/264 |
| 2010/0187219 A1* | 7/2010 | Besore et al. ................. | 219/494 |
| 2010/0292856 A1 | 11/2010 | Fujita | |
| 2011/0062142 A1* | 3/2011 | Steurer ......................... | 219/483 |
| 2011/0153109 A1 | 6/2011 | Drake et al. | |

* cited by examiner

*Primary Examiner* — Michael D Masinick
(74) *Attorney, Agent, or Firm* — Dority & Manning, P.A.

(57) ABSTRACT

An energy management system for altering power consuming functions on an electrical device during specified periods of time, e.g., peak energy demand periods. The system includes an electrical device having one or more power consuming functions, a memory for storing power consuming function profiles corresponding to the one or more power consuming functions associated with the electrical device, and at least one processor. The at least one processor is programmed to access the power consuming function profiles associated with the electrical device, identify the one or more power consuming functions configured to be changed during a specified period of time, output the identified one or more power consuming functions, receive a request to not change at least one of the identified one or more power consuming functions, and prevent the requested one or more power consuming functions from being changed.

20 Claims, 2 Drawing Sheets

SYSTEM AND METHOD FOR OVERRIDING DEMAND SYSTEM MANAGEMENT ENABLED FUNCTIONS

BACKGROUND OF THE INVENTION

The field of the disclosure relates generally to altering power consuming functions on an electrical device, and more specifically to a system and method for altering power consuming functions on an electrical device during periods of peak energy demand.

With increasing cost of fuel prices and high energy usage at certain parts of the day, utilities have to buy more energy to supply customers during peak demand. Consequently, utilities are charging higher rates during peak demand. If peak demand can be lowered, then a potential huge cost savings can be achieved and the peak load that the utility has to accommodate is lessened.

More recently, various types of dynamic pricing, such as real-time energy pricing, have been introduced. Dynamic pricing provides market transparency that exposes customers to time variations in energy costs, encouraging customers to shift their electrical energy usage into periods of lower demand, and therefore, lower prices. Dynamic pricing is being increasingly used to mitigate power shortages and, in this context, it is referred to as a "demand response". Utilities and their regulators have implemented demand response as programs, which provide incentives to reduce electrical demand during power shortages. In some cases, these incentives are contingent upon a customer reducing usage below some prescribed limit during each hour or each metering interval. If the customer fails to observe these limits, the incentives may be lost, harsh penalties may be imposed, or both.

To decrease an amount of energy used during peak demand, one conventional solution is to provide a system where a controller "turns off" a supply of power to an electrical appliance during times of peak demand or "turns off" certain functions of an electrical appliance during times of peak demand. However, while turning off power to electrical appliances and/or functions of electrical appliances help the utility and save a consumer money, there may be times when the consumer would like to override this mode and return to normal operation despite higher utility costs.

BRIEF DESCRIPTION OF THE INVENTION

In one aspect, an energy management system for altering power consuming functions on one or more electrical devices during periods of peak energy demand is provided. The system includes a meter configured to measure electric energy usage, at least one electrical device associated with the meter, the electrical device having one or more power consuming functions, a memory configured to store power consuming function profiles corresponding to the one or more power consuming functions associated with the at least one electrical device, and at least one processor. The processor is programmed to access the power consuming function profiles associated with the electrical device, based on the accessed power consuming function profiles, identify the one or more power consuming functions configured to be changed during a specified period of time, output the identified one or more power consuming functions configured to be changed during a specified period of time, receive a request to not change the identified one or more power consuming functions during the specified period of time, and prevent the one or more power consuming functions from being changed during the specified period of time.

In another aspect, a method is provided. The method includes accessing power consuming function profiles associated with one or more electrical devices, based on the accessed power consuming function profiles, identifying one or more power consuming functions configured to be changed during a specified period of time, outputting the identified one or more power consuming functions configured to be changed during a specified period of time, receiving a request to not change the identified one or more power consuming functions during the specified period of time, and preventing the one or more power consuming functions from being changed during the specified period of time.

In yet another aspect, an electrical appliance is provided. The electrical appliance includes a memory for storing power consuming function profiles corresponding to one or more power consuming functions associated with the electrical appliance, and at least one processor. The at least one processor is programmed to access the power consuming function profiles associated with the electrical appliance, based on the accessed power consuming function profiles, identify one or more power consuming functions configured to be changed during a specified period of time, outputting the identified one or more power consuming functions configured to be changed during a specified period of time, receive a request to not change the identified one or more power consuming functions during the specified period of time, and prevent the one or more power consuming functions from being changed during the specified period of time.

BRIEF DESCRIPTION OF THE DRAWINGS

The present disclosure is described in detail below with reference to the attached figures.

DETAILED DESCRIPTION OF THE INVENTION

While embodiments of the disclosure are illustrated and described herein with reference to altering power consuming functions on an electrical device, and more specifically to a system and method for altering power consuming functions on an electrical device during periods of peak energy demand, aspects of the disclosure are operable with any system that performs the functionality illustrated and described herein, or its equivalent.

Dynamic pricing provides market transparency that exposes customers to time variations in energy costs, encouraging customers to shift their electrical energy usage into periods of lower demand, and therefore, lower prices. Dynamic pricing is being increasingly used to mitigate power shortages and, in this context, it is referred to as a "demand response". Utilities and their regulators have implemented demand response as programs, which provide incentives to reduce electrical demand during power shortages. In some cases, these incentives are contingent upon a customer reducing usage below some prescribed limit during each hour or each metering interval. If the customer fails to observe these limits, the incentives may be lost, harsh penalties may be imposed, or both.

Typically, the total demand of a facility fluctuates markedly, due to many individual electrical loads turning on and off at irregular intervals. Thus, an ability to refine load control to a higher degree of resolution, for example, at an individual electrical device level, can produce greater accuracies and better performance in load control strategies. However, because conventional electric meters cannot determine the electric energy usage of individual electrical devices, for example, a heating, ventilation, and air conditioning (HVAC) system, a washing machine, a dryer, a dishwashing machine, a hybrid vehicle, a pool pump, and the like, using demand side management (DSM) enabled electrical appliances that automatically shed load by changing power consuming functions help the utility and save the consumer money. For example, DSM enabled refrigerators respond to an indication that a peak energy demand is in process by shedding load by changing set points in the freezer and/or fresh food compartments, delaying defrost, disabling certain features (e.g., Fast Freeze, Quick Ice, Turbo Cool), and disabling electronically controlled sweat heaters. However, there may be times where the consumer would like to override the DSM mode and return to normal operation despite the higher utility cost. Aspects of the present disclosure enable a user to selectively override the DSM mode on some or all power consuming functions on a DSM enabled electrical appliance.

Figure 1:
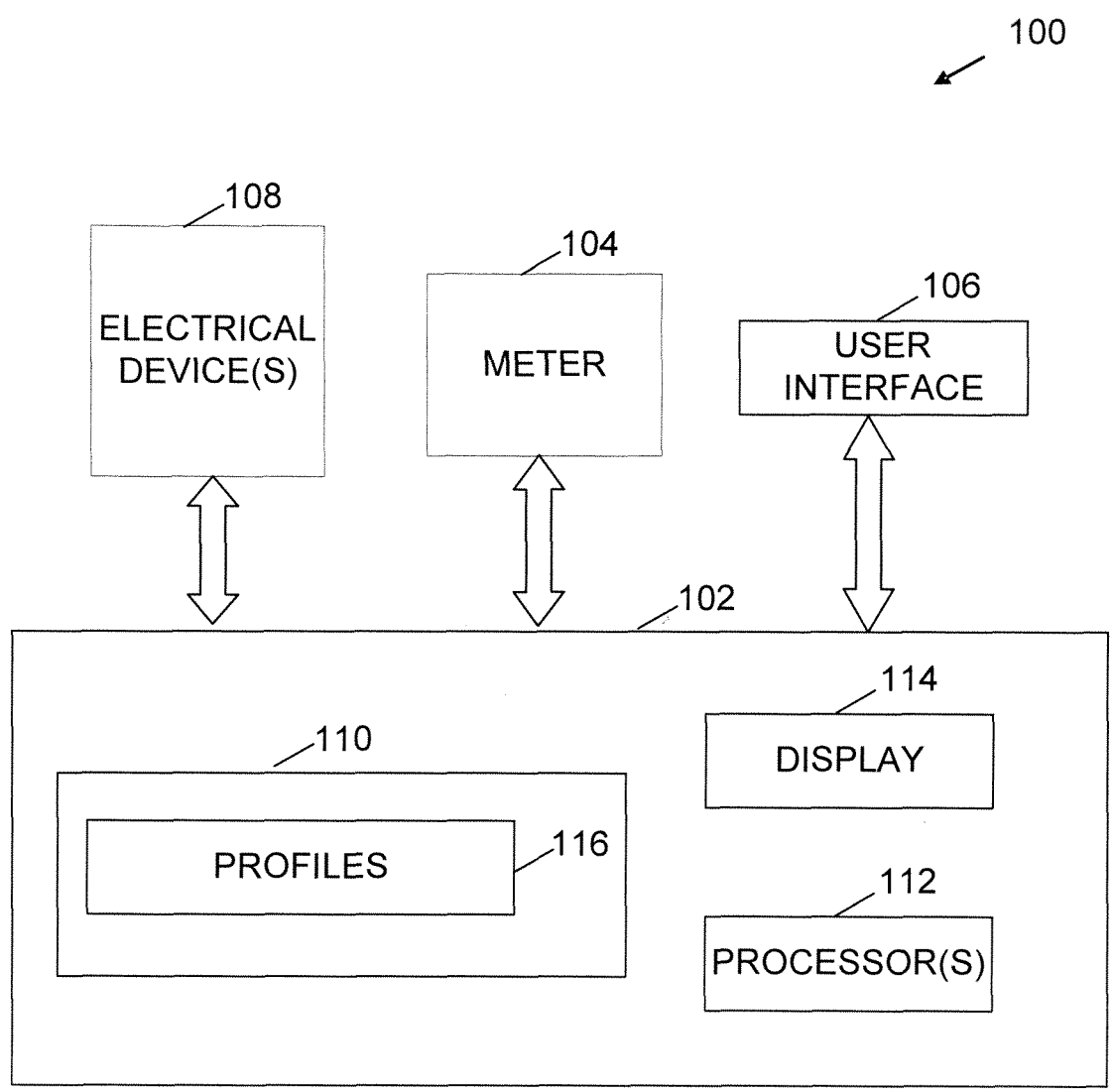
FIG. 1 is a block diagram of an electric energy measurement system.

With reference to FIG. 1, a block diagram of an electric energy measurement system 100 is provided. System 100 includes a controller 102 communicatively coupled to a meter 104, which is configured to measure electric energy usage, and a home area network (HAN) user interface 106. The controller 102 is also communicatively coupled with one or more electrical devices 108 so that the one or more electrical devices can receive one or more signals outputted from the controller 102 that adjust and/or enable or disable one or more power consumption modes or settings of the one or more electrical devices 108. The signals outputted from the controller allocate energy to the one or more electrical devices 108, and may be based on one or more of: data outputted from the meter which is indicative of energy usage by the one or more electrical devices (108), a demand limit (e.g., an amount of energy available during a peak demand period, an off-peak demand period, a high demand period, a low demand period, and/or one or more intermediate demand); a prioritization of the one or more electrical devices (108) (e.g., certain electrical devices are allocated energy before other electrical devices and/or are allocated more energy than other electrical devices); and an energy need level of the one or more electrical devices (108) (e.g., a level each of the one or more electrical devices require to function at a desired state).

Controller 102 may be a portable computing device such as, but not limited to: a smartphone, a laptop, a computer tablet, a netbook, and/or a portable media player. Further, controller 102 may include any device executing instructions (e.g., application programs), or represent a group of processing units or other controllers. In addition, although controller 102, meter 104, and HAN user interface 106 are shown as being separate devices in FIG. 1, features of device 102, meter 104, and HAN user interface 106 may be combined into, for example, one or more devices. For example, electrical device(s) 108 may include HAN user interface 106 and/or controller 102. Further, controller 102 may include a user interface (e.g., HAN user interface 106).

Controller 102 may communicate with meter 104, HAN user interface 106, and the one or more electrical devices 108 via wired and/or wireless networks, for example, local area networks or global networks such as the Internet. In embodiments in which controller 102 communicates using wireless networks, controller 102 may be enabled with technology such as BLUETOOTH brand wireless communication services (secured or unsecured), radio frequency identification (RFID), Wi-Fi such as peer-to-peer Wi-Fi, ZIGBEE brand wireless communication services, near field communication (NFC), and other technologies that enable short-range or long-range wireless communication. In some embodiments, controller 102 may communicate via a wireless cellular network providing Internet access.

Controller 102 includes a memory 110, a display 114 and at least one processor 112. Display 114 may be, for example, an LED or LCD that displays energy used. In one embodiment, display 114 may perform the functionalities of HAN user interface 106. Thus, as discussed above, HAN user interface 106 may be separate from (as shown in FIG. 1) or integrated within controller 102 as display 114. HAN user interface 106 and/or display 114 act as a user input selection device providing user input functionality. In one embodiment, HAN user interface 106 and/or display 114 may be a capacitive touch screen display configured to be responsive to a user pressing contact on a screen to selectively perform functionality. Thus, a user can operate the desired functions by contacting a surface of HAN user interface 106 and/or display 114 as well as other functions provided herein.

Memory 110 or other computer-readable medium or media, stores power consuming function profiles 116 (e.g., an overview of how much power each function of the electrical device uses over a period of time) corresponding to one or more power consuming functions associated with one or more electrical devices 108. While memory 110 is shown to be stored in controller 102, memory 110 may be remote from controller 102 and coupled with the controller 102 and/or the processor 112, for example, via a cloud service or other remote network. Such configurations can reduce the computational and storage burden on controller 102.

Processor 112 accesses and executes computer-executable instructions for implementing aspects of this disclosure. In some embodiments, processor 112 is transformed into a special purpose microprocessor by executing computer-executable instructions or by otherwise being programmed. For example, processor 112 is programmed with instructions such as illustrated below with respect to FIG. 2.

Controller 102 is configured to selectively adjust and/or disable at least one of the one or more power consuming features/functions (e.g., disable air conditioning on the HVAC system or limiting an amount of ice made per hour in a freezer) on electrical device(s) 108 to reduce power consumption of electrical device(s) 108. By this arrangement electrical device(s) 108 can be operated in an energy savings mode during peak demand.

It should be appreciated that controller 102 can be configured with default settings which govern a normal mode (e.g., during non-peak demand periods) and an energy savings mode operation (e.g., during peak demand periods). Such settings in each mode can be fixed while others are adjustable to user preference and to provide response to load shedding signals from meter 104.

If controller 102 receives and processes an energy signal (or data) indicative of a peak demand period from, for example, meter 104 at any time during operation of electrical device(s) 108, controller 102 processes this signal (or data) to determine and identify which if any one or more of the power consuming features/functions may be operated in an energy savings mode. The controller 102 outputs one or more signals to the one or more electrical devices 108. The signal(s) outputted from the controller 102 cause the identified features/functions of electrical device(s) 108 to begin operating in the energy savings mode in order to reduce the instantaneous amount of energy being consumed.

In one embodiment, based on instructions provided by a user, controller 102 determines what power consuming features/functions of the electrical device(s) 108 should be operated at a lower consumption level and what that lower consumption level should be, rather than an uncontrolled immediate termination of the operation of specific features/functions.

In one embodiment, prior to entering an energy savings mode, controller 102 provides a user with a warning via, for example, display 114 indicating a start of an energy savings mode. At this time, or anytime thereafter, a user may override the energy savings mode of one or more of the power consuming features/functions of electrical device(s) 108 via user interface 106. For example, a manual or selectable override can be provided on user interface 106 providing a user the ability to select which of the one or more power consuming features/functions are delayed, adjusted and/or disabled by controller 102 in the energy savings mode prior to or after controller 102 provides a user with a warning. The user can override any adjustments, whether time related or function related, to any of the power consuming functions.

Further, the user can override the current operating mode of electrical device(s) 108. Particularly, if a utility state (e.g., a current state a utility is in with respect to how much energy the utility has available) has an associated energy cost, the user can base operation of electrical device(s) 108 on a user selected targeted energy cost by having knowledge of a pricing tier or cost per kilowatt hour charged by the corresponding utility. Thus, as further explained below, if the current cost exceeds a user selected cost, controller 102 operates electrical device(s) 108 in the energy savings mode. If the current cost is less than the user selected cost, controller 102 operates electrical device(s) 108 in the normal mode.

In one embodiment, display 114 can be configured to provide active, real-time feedback to a user on the cost of operating electrical device(s) 108. The costs associated with using electrical device(s) 108 are generally based on current operating and usage patterns and energy consumption costs, such as the cost per kilowatt hour charged by the corresponding utility. In this embodiment, controller 102 is configured to gather information and data related to current usage patterns and as well as current power costs from, for example, the utility. As further explained below, this information and data can be used to determine current energy usage and cost associated with using electrical device(s) 108 in one of the energy savings mode and normal mode. This real-time information (i.e., current usage patterns, current power cost and current energy usage/cost) can be presented to the user via the display and thus enable a user to make a more informed decision as to whether or not the user would like to operate electrical device(s) 108 during peak demand.

In one embodiment, the identification of which power consuming features/functions are operated in an energy savings mode for an electrical device may depend on what "stage" the electrical device is currently operating in. For example, an identification of which power consuming features/functions are operated in an energy savings mode for an HVAC system may depend on whether the HVAC system is currently operating in a cooling cycle or a heating cycle. In one embodiment, controller 102 may include functionality to determine whether activation of the energy savings mode for any power consuming features/functions would potentially cause damage to any feature/function of the HVAC system itself or would cause the HVAC system to fail to perform its intended function. Details of this functionality are further described below. If controller 102 determines that an unacceptable consequence may occur by performing an energy saving action, such as deactivating or curtailing the operation of a refrigeration system, controller 102 may opt-out of performing that specific energy saving action or may institute or extend other procedures.

The duration of time that electrical device(s) 108 operates in the energy savings mode may be determined by information in an energy signal received from a utility provider directly when immediate load reduction is necessary or otherwise via the meter 104. The energy signal may be indicative of a utility state (defined above), and may contain data that causes the controller 102 to operate the one or more electrical devices 108 in an energy savings mode for a predetermined time, at which time electrical device(s) 108 return to normal operation. In one embodiment, once transmission of the energy signal has ceased, electrical device(s) 108 returns to normal operating mode. In yet another embodiment, an energy signal may be transmitted to controller 102 to signal electrical device(s) 108 to operate in the energy savings mode and a normal operation signal may then be later transmitted to controller 102 that causes the controller 102 to output a signal that causes the electrical device(s) 108 to return to the normal operating mode.

Figure 2:
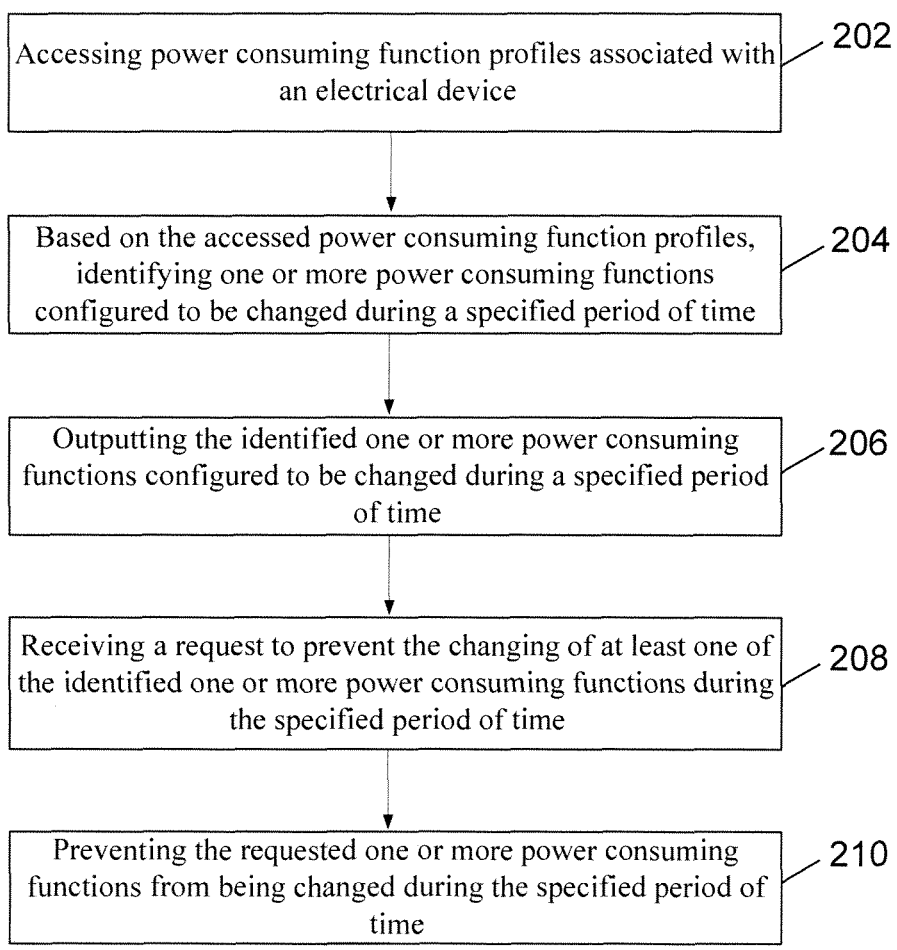
FIG. 2 is a process flow diagram of a method for altering power consuming functions on an electrical device during periods of peak energy demand.

Referring next to FIG. 2, an exemplary flow chart illustrates how the controller 102 and/or the processor 112 alter the operation of power consuming functions on an electrical device (e.g., electrical device(s) 108 in FIG. 1) during a specified period of time, e.g., a period of peak energy demand. The power consuming function profiles include parameters for each power consuming function of each of electrical device(s) 108. For example, a power consuming function profile may include an indication as to when a particular power consuming function is or is not to be disabled during a peak demand and/or during particular parts of a day. At 202, power consuming function profiles associated with the electrical device(s) 108 are accessed by, for example, controller 102 (shown in FIG. 1), and more specifically, processor 112 (shown in FIG. 1). In one embodiment, power consuming function profiles are accessed when it is determined to place electrical device(s) 108 in energy savings mode, for example, when a peak energy demand is identified. At 204, the processor 112 uses the accessed power consuming function profiles to identify one or more power consuming functions that can be changed during the specified period of time, to reduce energy consumption by the one or more electrical device(s) 108. The processor 112 (or meter 104 or a utility provider) outputs an indication of a current energy demand (low, medium, high or critical) to a display (e.g., display 114 in FIG. 1). During times of high or critical energy demand mode, the processor 112 may automatically output one or more signals to the one or more electrical device(s) 108 that disable one or more power consuming functions of the electrical device(s) 108.

At 206, the processor outputs the identified one or more power consuming functions that can be changed during a specified period of time (e.g., a time of peak energy demand). The processor 112 identifies the power consuming functions at the beginning of or during a specified period of time, e.g., during a period of a peak energy demand. Alternatively or additionally, the processor 112 could be configured to identify the power consuming functions upon receiving a request from the user interface. For example, a user may request to see which power consuming functions of electrical device(s) 108 will be altered during a peak energy demand for the current system configuration. Either way, when the functions that can be changed are identified, the user may select which of the power consuming functions are to be changed and which are not. For example, a user may determine that electronically controlled sweat heaters on a refrigerator may be disabled during a peak energy demand, but the user selects an ice maker to continue making ice during the peak energy demand. Thus, in one embodiment, a user may personalize each power consuming function of electronic device(s) 108 that may be disabled during a peak energy demand period.

At 208, the processor 112 determines if a request to not change at least one of the identified one or more power consuming functions during a peak energy demand is received from the user interface. In one embodiment, a user may be informed via, for example, a message on display 114 that a particular power consuming function is either disabled or is about to be disabled due to a peak energy demand. In response to this indication, the user may override the current settings that will otherwise disable the one or more power consuming functions by requesting that at least one of the identified one or more power consuming functions be prevented from being disabled or otherwise changed during the specified time period, e.g., the peak energy demand period. In one embodiment, the user is presented with an option to selectively override the disabling of one or more power consuming functions by selecting an appropriate box on display 114. In addition, the user may choose to delay the disabling for a specified period of time. In a further embodiment, particular DSM modes may be overridden automatically based on an indication that a user is home. Examples of such indications include but are not limited to: a security alarm being disabled, a garage door being opened/closed, and particular lights being turned on, etc. At 210, the processor 112 enables or maintains the one or more power consuming functions that are not be changed during the specified time (of peak energy demand) thereby preventing such functions from being changed during the specified time.

Exemplary Operating Environment

A controller or computing device such as is described herein has one or more processors or processing units, system memory, and some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal, such as a carrier wave or other transport mechanism, and include any information delivery media. Combinations of any of the above are also included within the scope of computer readable media.

The controller/computer may operate in a networked environment using logical connections to one or more remote computers, such as a remote computer. Although described in connection with an exemplary computing system environment, embodiments of the present disclosure are operational with numerous other general purpose or special purpose computing system environments or configurations. The computing system environment is not intended to suggest any limitation as to the scope of use or functionality of any aspect of the present disclosure. Moreover, the computing system environment should not be interpreted as having any dependency or requirement relating to any one or combination of components illustrated in the exemplary operating environment.

Examples of well known computing systems, environments, and/or configurations that may be suitable for use with aspects of the present disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the present disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the present disclosure may be implemented with any number and organization of such components or modules. For example, aspects of the present disclosure are not limited to the specific computer-executable instructions or the specific components or modules illustrated in the figures and described herein. Other embodiments of the present disclosure may include different computer-executable instructions or components having more or less functionality than illustrated and described herein. Aspects of the present disclosure may also be practiced in distributed computing environments where tasks are performed by remote processing devices that are linked through a communications network. In a distributed computing environment, program modules may be located in both local and remote computer storage media including memory storage devices.

Aspects of the present disclosure transform a general-purpose computer into a special-purpose computing device when configured to execute the instructions described herein.

The order of execution or performance of the operations in embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

When introducing elements of aspects of the present disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the present disclosure in detail, it will be apparent that modifications and variations are possible without departing from the scope of aspects of the present disclosure as defined in the appended claims. As various changes could be made in the above constructions, products, and methods without departing from the scope of aspects of the present disclosure, it is intended that all matter contained in the above description and shown in the accompanying drawings shall be interpreted as illustrative and not in a limiting sense.

This written description uses examples to disclose the claimed subject matter, including the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system to alter power consuming functions of an electrical device, the system comprising:
    a memory to store one or more power consuming function profiles corresponding to one or more power consuming functions associated with the electrical device, at least one function profile including an indication as to when an associated power consuming function is or is not to be disabled during a targeted energy cost function profile; and
    at least one processor coupled with the memory and programmed to:
        detect a demand response signal requiring the electrical device to be operated in an energy savings mode, and while the demand response signal is being detected;
        access the one or more power consuming function profiles associated with the electrical device;
        identify, based on the accessed one or more power consuming function profiles, one or more operations of power consuming functions within the electrical device to be changed to operate the electrical device in accordance with the targeted energy cost function profile in the energy savings mode, wherein the processor excludes operations changes that would damage the electrical device, and excludes power consuming functions that are not to be disabled based on the time the demand response signal is detected;
        output an alert identifying the one or more operations of the power consuming functions to be changed to operate the electrical device in accordance with the targeted energy cost function profile in the energy savings mode;
        receive a request responsive to the alert to override the demand response signal and to not change at least one of the identified one or more operations of the power consuming functions of the targeted energy cost function profile;
        prevent the at least one of the identified one or more operations of the power consuming functions from being changed during operation of the targeted energy cost function profile; and
        wherein the at least one processor is further programmed to return the electrical device to a normal operating mode when transmission of the demand response signal has ceased, and
        wherein the targeted energy cost function profile is calculated using at least one utility pricing tier and current operating and usage patterns of the electrical device.

2. The system of claim 1, wherein the energy savings mode is activated during a period of high or critical energy demand.

3. The system of claim 1, further comprising:
    a user interface coupled with the processor,
    wherein the processor is further programmed to:
        output the identified one or more operations of the power consuming functions to be changed during the targeted energy cost function profile to the user interface; and
        receive a request from the user interface to override the demand response signal and not change at least one of the identified one or more operations of the power consuming functions of the targeted energy cost function profile.

4. The system of claim 1, further comprising:
    a meter coupled with the processor, the meter configured to measure electric energy usage of the electrical device and to output data indicative of the measured electric energy usage,
    wherein the processor is further programmed to receive the data outputted from the meter and to determine the targeted energy cost function profile based on at least this outputted data.

5. The system of claim 4, wherein the processor alters power consuming functions of the electrical device based on one or more of the following:
    a demand limit;
    a prioritization of the electrical device and one or more additional electrical device associated with the meter; and
    an energy need level of the electrical device.

6. The system of claim 1, wherein the electrical device is one of a refrigerator, a washer, a dryer, an oven, a stove, a microwave oven, a dishwasher, a heating system, a ventilation system, and an air conditioning system.

7. A method of operating an electrical device, comprising:
    detecting a demand response signal requiring the electrical device to be operated in an energy savings mode while the demand response signal is being detected;
        accessing power consuming function profiles associated with the electrical device, at least one function profile including an indication as to when an associated power consuming function is or is not to be disabled during a targeted energy cost function profile;
        identifying, based on the accessed power consuming function profiles, one or more operations of power consuming functions within the electrical device to be changed to operate the electrical device in accordance with the targeted energy cost function profile in the energy savings mode, excluding operations changes that would damage the electrical device and excluding power consuming functions that are not to be disabled based on the time the demand response signal is detected;
        outputting an alert identifying the one or more operations of the power consuming functions configured to be changed to operate the electrical device in accordance with the targeted energy cost function profile in the energy savings mode;
        receiving a request responsive to the alert to override the demand response signal and to not change at least one of the identified one or more operations of the power consuming functions of the targeted energy cost function profile;
        preventing the at least one of the identified operations of the one or more power consuming functions from being changed during operation of the targeted energy cost function profile; and
    returning the electrical device to a normal operating mode when transmission of the demand response signal has ceased.

8. The method of claim 7, wherein the energy savings mode is activated during a period of high or critical energy demand.

9. The method of claim 7, further comprising:
    presenting, via a user interface, the identified one or more operations of the power consuming functions configured to be changed during the targeted energy cost function profile; and receiving, via the user interface, a request to override the demand response signal and not change selected ones of the at least one of the identified one or more operations of the power consuming functions during the targeted energy cost function profile.

10. The method of claim 9, further comprising:
receiving an energy signal from one of a meter and a utility provider; and
determining the targeted energy cost function profile based on the received energy signal.

11. The method of claim 7, further comprising operating the electrical device in the energy savings mode based on one or more of the following:
a demand limit;
a prioritization of the electrical device; and
an energy need level of the electrical device.

12. An electrical appliance, comprising:
a memory to store one or more power consuming function profiles corresponding to one or more power consuming functions associated with the electrical device, at least one function profile including an indication as to when an associated power consuming function is or is not to be disabled during a targeted energy cost function profile; and
at least one processor coupled with the memory and programmed to:
detect a demand response signal requiring the electrical device to be operated in an energy savings mode, and while the demand response signal is being detected;
access the one or more power consuming function profiles associated with the electrical device;
identify, based on the accessed one or more power consuming function profiles, one or more operations of power consuming functions within the electrical device to be changed to operate the electrical device in accordance with the targeted energy cost function profile in the energy savings mode, wherein the processor excludes operations changes that would damage the electrical device, and excludes power consuming functions that are not to be disabled based on the time the demand response signal is detected;
output an alert identifying the one or more operations of the power consuming functions to be changed to operate the electrical device in accordance with the targeted energy cost function profile in the energy savings mode;
receive a request responsive to the alert to override the demand response signal and to not change at least one of the identified one or more operations of the power consuming functions of the targeted energy cost function profile;
prevent the at least one of the identified one or more operations of the power consuming functions from being changed during operation of the targeted energy cost function profile; and
wherein the at least one processor is further programmed to return the electrical device to a normal operating mode when transmission of the demand response signal has ceased.

13. The electrical appliance of claim 12, wherein the energy savings mode is activated during a period of high or critical energy demand.

14. The electrical appliance of claim 12, further comprising:
a user interface coupled with the processor,
wherein the processor is further programmed to:
output the identified one or more operations of the power consuming functions to be changed during the targeted energy cost function profile to the user interface; and
receive a request from the user interface to override the demand response signal and not change at least one of the identified one or more operations of the power consuming functions of the targeted energy cost function profile.

15. The electrical appliance of claim 12, further comprising:
a meter coupled with the processor, the meter configured to measure electric energy usage of the electrical device and to output data indicative of the measured electric energy usage,
wherein the processor is further programmed to receive the data outputted from the meter and to determine the targeted energy cost function profile based on at least this outputted data.

16. The electrical appliance of claim 15, wherein the processor alters power consuming functions of the electrical device based on one or more of the following:
a demand limit;
a prioritization of the electrical device and one or more additional electrical device associated with the meter; and
an energy need level of the electrical device.

17. The electrical appliance of claim 12, wherein the electrical appliance is one of a refrigerator, a washer, a dryer, an oven, a stove, a microwave oven, a dishwasher, a heating system, a ventilation system, and an air conditioning system.

18. The system of claim 1, wherein the at least one processor coupled with the memory is programmed to:
identify a current operating state of the electrical device;
determine if changing one or more of the identified one or more operations of the power consuming functions to operate the electrical device in the energy savings mode will cause the electrical device to not be able to perform an intended function; and, if so,
override the demand response signal and maintain an operational state of the identified one or more operations of the power consuming functions in a non-energy savings mode.

19. The method of claim 7, comprising:
identifying a current operating state of the electrical device;
determining if changing one or more of the identified one or more operations of the power consuming functions to operate the electrical device in the energy savings mode will cause the electrical device to not be able to perform an intended function; and, if so,
overriding the demand response signal and maintain a state of the identified one or more operations of the power consuming functions to operate the electrical device in a non-energy savings mode.

20. The electrical appliance of claim 12, wherein the at least one processor is programmed to:
identify a current operating state of the electrical appliance;
determine if changing one or more of the identified one or more operations of the power consuming functions to operate the electrical appliance in the energy savings mode will cause the electrical appliance to not be able to perform an intended function; and, if so, override the demand response signal and maintain a state of the identified one or more operations of the power consuming functions to operate the electrical appliance in a non-energy savings mode.

\* \* \* \* \*